No. 851,836. PATENTED APR. 30, 1907.
L. J. RING.
SPRING MOTOR.
APPLICATION FILED AUG. 18, 1904.

3 SHEETS—SHEET 1.

Witnesses.
A. H. Opsahl.
E. W. Jeppesen

Inventor.
Lewis J. Ring
By his Attorneys.
Williamson & Merchant

No. 851,836. PATENTED APR. 30, 1907.
L. J. RING.
SPRING MOTOR.
APPLICATION FILED AUG. 18, 1904.

3 SHEETS—SHEET 3.

Witnesses
A. H. Opsahl
E. W. Jeppesen.

Inventor.
Lewis J. Ring
By his Attorneys
Williamson Merchant

UNITED STATES PATENT OFFICE.

LEWIS J. RING, OF STANTON, IOWA.

SPRING-MOTOR.

No. 851,836.  Specification of Letters Patent.  Patented April 30, 1907.

Application filed August 18, 1904. Serial No. 221,169.

*To all whom it may concern:*

Be it known that I, LEWIS J. RING, a citizen of the United States, residing at Stanton, in the county of Montgomery and State of Iowa, have invented certain new and useful Improvements in Spring-Motors; and I do hereby declare the following to be a full, clear, and exact description of the invention, such as will enable others skilled in the art to which it appertains to make and use the same.

My present invention relates to spring motors and has for its object to improve the same in the several particulars hereinafter noted.

The invention consists of the novel devices and combination of devices hereinafter described and defined in the claims.

In the accompanying drawings, which illustrate my invention, like characters indicate like parts throughout the several views.

Figure 1:
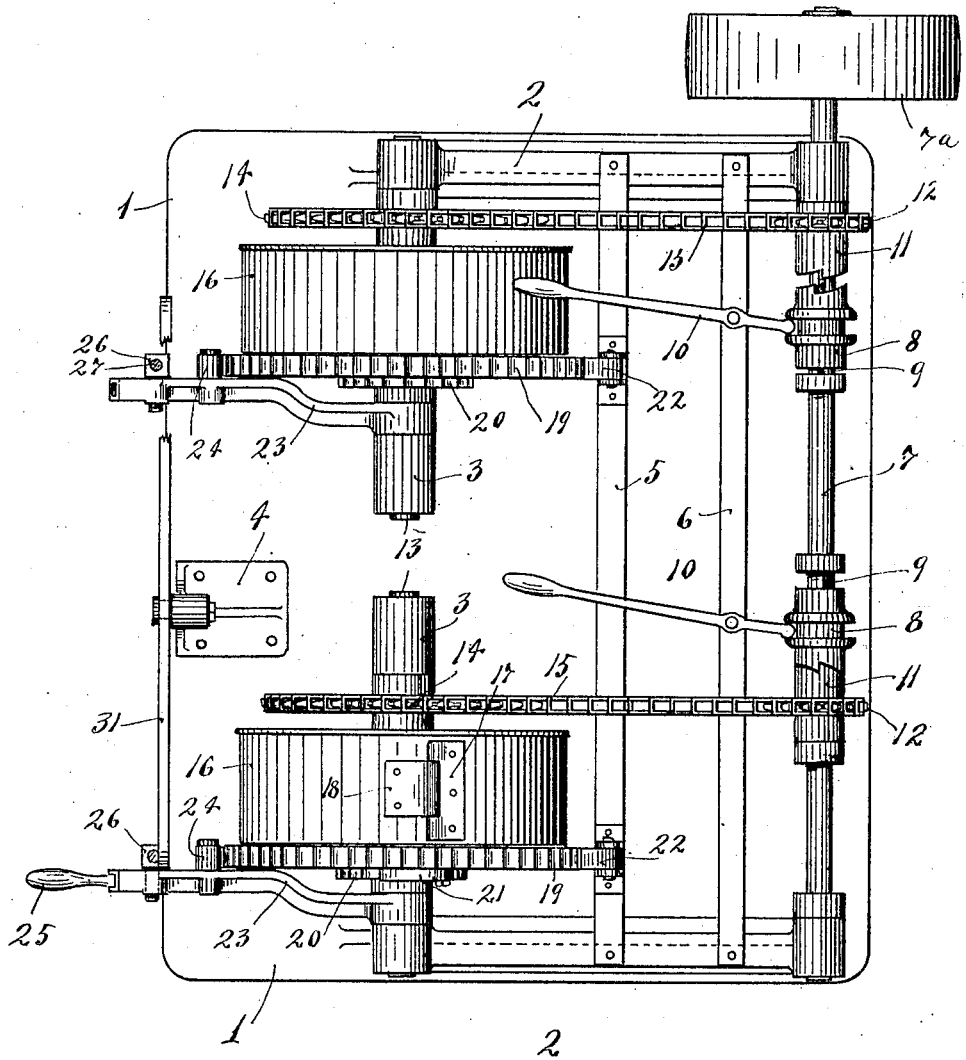
Figure 2:
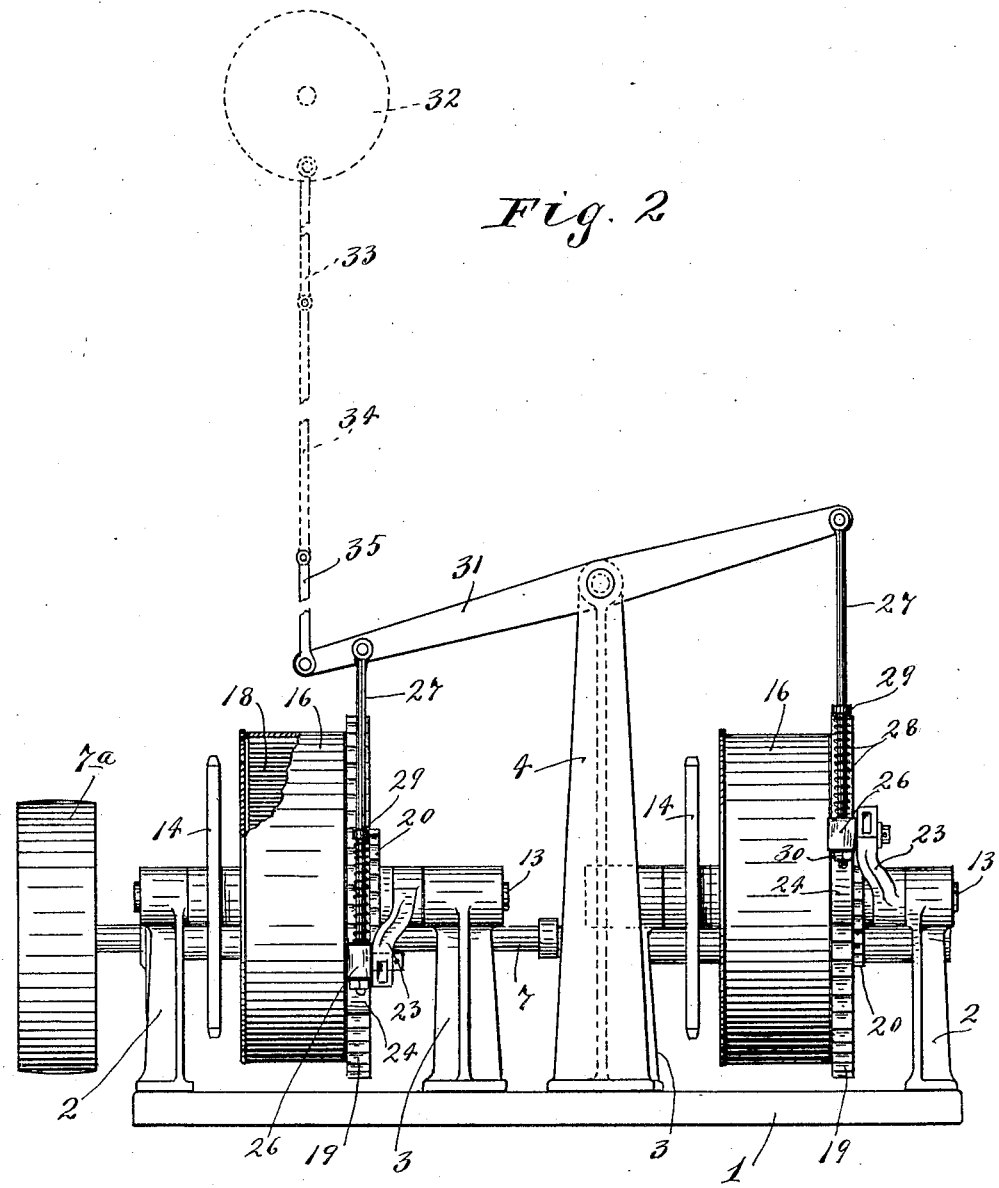
Figure 3:
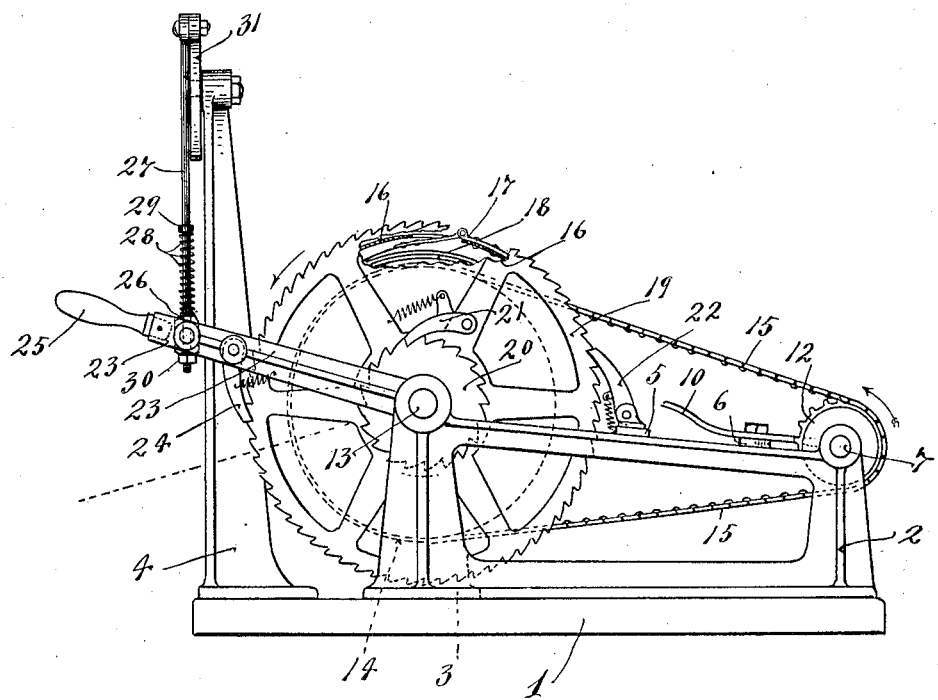

Figure 1 is a plan view showing my improved spring motor applied as a stationary power plant and in which the spring motor, or motors, are kept wound up from a power driven crank, such as the crank of a windmill. Fig. 2 is a view in front elevation of the parts shown in Fig. 1, the power driven crank of a wind-mill and the rod connections being indicated by dotted lines, some parts of one of the motors being broken away, and: Fig. 3 is a side elevation of the parts shown in Fig. 1, some parts being broken away.

The numeral 1 indicates a suitable bed-plate, or support, which in practice may be a portion of a floor. Rigidly secured on this support 1 is a pair of laterally spaced end-bearing brackets 2 and a pair of co-operating bearing pedestals 3 and a lever support 4. The bearing brackets 2 at their upper intermediate portions are connected by rigid tie bars 5 and 6 that afford supports for parts presently to be described.

Loosely mounted in the right hand ends of the bearing brackets 2, as viewed in Figs. 1 and 3, is a counter shaft 7, which carries a pulley 7ª and a pair of sliding half clutches 8, which half clutches are caused to rotate the said counter shaft by means of splines 9. Shipper levers 10 pivoted on tie bar 6 operate on the half clutches 8 to move them into and out of action on co-operating half clutches 11, loosely mounted on the counter shaft 7 but held against sliding movements thereon. The half clutches 11 are provided with sprockets 12.

Loosely mounted at their outer ends in the bearing brackets 2 and at the inner ends in the bearing pedestals 3 are axially alined counter shafts 13, on which are loosely mounted sprockets 14, over which and the alined sprockets 12, run sprocket chains 15. Loosely mounted on each shaft 13 and secured to the adjacent sprocket 14, is a drum-like spring case 16, to the peripheral portion of which, at 17, is pivotally attached the outer end of a flat coiled motor spring 18, the inner end of which spring is rigidly attached to the corresponding shaft 13.

Loosely mounted on each counter shaft 13 at the side of the spring case 16 is a large ratchet wheel 19, adjacent to which is the small ratchet wheel 20, secured to said shaft. The large ratchet wheel 19 has a spring pressed pawl 21 that engages the ratchet wheel 20 and drives the latter when the said large ratchet wheel is moved in the direction indicated by the arrow marked on Fig. 3. Backward movements of the ratchet wheel 19 are prevented by a spring-pressed retaining pawl 22, which, as shown, is pivoted on the tie bar 5.

Pivotally mounted on each counter shaft 13 is a oscillating lever 23, which carries a spring press driving pawl 24 that operates on the teeth of the large ratchet wheel 19, under downward movements of said lever. As shown the levers 23 are provided at their free ends with hand pieces 25, and to each lever is pivoted a bearing block 26, through which is passed the lower end of a connecting rod 27. Coiled springs 28 on the rods 27 are compressed between the bearing blocks 26 and fixed collars 29 on said rod. Nuts 30 on the rods 27, below the blocks 26, cause the said levers to rise with the rods 27. The upper ends of the rods 27 are pivotally attached to the opposite ends of a walking beam 31, which beam at its intermediate points is pivoted to the lever bearing 4.

With the construction described it is evident that when the beam 31 is oscillated, whether by hand power or otherwise, the levers 23 will be given their downward operative movements in alternate order, so that the one spring 18 will be wound by a movement of its shaft 13, while the other shaft 13 is held stationary and the spring attached thereto is being unwound. In fact neither of the springs will at any time be entirely unwound and hence both thereof at all times, when coupled to the shaft 7, will through the sprocket chains 15 and other connections already described, exert power tending to rotate the said shaft 7.

Motion is transmitted to the machine or device which is to be run from the spring motor in any one of the many different possible ways, such for instance as by a belt (not shown), but which will run over the pulley 7ª.

This spring motor device is especially adapted for use as an intermediate means for storing up power and for affording a continuous application of power, where the source of power is transmitted to the spring motor by a rotating crank, driven from a wind-mill, or any other primary source of power. An objectionable feature to the use of a crank, as is well known, is the variable power and speed transmitted therethrough, due to the fact that the said crank twice in each rotation passes a dead center. With my improved spring motor the objection to the use of a crank is overcome and a continuous application of power is afforded.

In Fig. 2 of the drawings the power driven crank, in the form of a crank disk 32 is indicated by dotted lines. This crank disk 32 is shown as connected to one end of the walking beam 31, by means of a connecting rod 33, a vertically movable rod 34 and a lower crank rod 35, said parts 33 and 34 being indicated by dotted lines. With this arrangement is evident that one of the springs 18 will be wound under the downward stroke of the crank 32 while the other spring will be wound by the upward movement of said crank.

The coiled springs 28 on the rods 27 are of such strength that under downward movements of said rods they will force down the levers 23 and wind up the motor springs 18 to their maximum desired tension, but will yield in case the said motor springs should become wound up to the desired limit. It will of course be understood that if the shaft 7 should be held stationary or if the work thereon should become excessive, the motor springs would quickly be wound up to their limit, and hence some means is necessary to prevent them from being overwound under the continued movement of the crank 32.

If, as may frequently happen, the crank 32 should be suddenly stopped, the shaft 7, and parts driven therefrom, will continue to run under momentum, this action may take place because the small ratchet wheel 20 is free to slip under the pawl 21 and run ahead of the large ratchet wheel 19 and thereby prevent the motor springs 18 from being broken or damaged by an excessive unwinding movement. With the construction described this same slipping action might take place between the co-operating half clutches 8 and 11, but the arrangement of the two ratchet wheels 19 and 20 and connecting pawl 21 are desirable since in many cases clutches having rectangular teeth may be employed, and it is often desirable to provide means for locking the shipper levers 10 in their set positions.

The device described is capable of a great many different uses. It is for instance well adapted for use on a hand car, or in connection with vehicles generally which are capable of being driven by manual power or by an engine for that matter. In applying the device to a hand car the walking beam 31 would be connected to the hand car lever, and the shaft 7 would be one of the axles of the car.

From what has been said it will be understood that the mechanism described is capable of modification within the scope of my invention as herein set forth and claimed. For instance, it will be understood that any desired number of spring motors may be coupled to the power driven shaft.

What I claim and desire to secure by Letters Patent of the United States, is as follows:

1. The combination with a pair of spring motors mounted in axial alinement one with the other, and having independent driving connections to a common shaft, means for rendering said connections independently operative and inoperative on said shaft, of pawl and ratchet devices for winding said motors, including the pawl equipped levers, a walking beam directly and yieldingly connected at its ends to said pawl equipped levers, and operating the same in alternate order, and means for operating said beam, substantially as described.

2. The combination with actuating means, of a spring motor having a winding shaft, ratchet mechanism connected with the shaft for rotating the same, and yieldable connecting means between the ratchet mechanism and the actuating means for enabling the spring motor to be directly wound up by the said actuating means on the power stroke thereof, said yieldable means being also adapted to permit the actuating means to operate independently of the motor shaft after a predetermined amount of power has accumulated.

3. In a wind mill attachment, the combination with actuating means, of power storing means adapted to be wound up, ratchet mechanism for winding the power storing means, and yieldable means connected with the ratchet mechanism for winding the power storing means on the power stroke of the actuating means, said yieldable means being adapted, after a predetermined amount of power has accumulated, to permit the actuating means to operate independently of the said attachment.

4. In a wind mill attachment, the combination with actuating means, of power storing means having a winding shaft, ratchet mechanism provided with an oscillatory lever and arranged to wind the said shaft on the power stroke of the actuating means, and a yieldable connection provided with means for connecting the lever with the said actuating means and for permitting the actuating means to operate independently of the winding shaft after a predetermined amount of power has accumulated.

5. In a wind mill attachment, the combination with power storing means having a winding shaft, ratchet mechanism for winding the said shaft, said ratchet mechanism being provided with an oscillatory lever, and a yieldable connection provided with means for connecting the lever with the pump rod of a wind mill, said connection being adapted, after a predetermined amount of power has accumulated, to permit the pump rod to operate independently of the said shaft, and the latter being directly actuated by the pump rod.

6. In a wind mill attachment, the combination with power storing means, ratchet mechanism for winding up the power storing means, said ratchet mechanism being provided with an oscillatory lever, and a reciprocating device connected with the lever of the ratchet mechanism and provided with means for connecting it with the pump rod of a wind mill, and having yieldable means for permitting the pump rod to operate without affecting the power storing means after a predetermined amount of power has accumulated.

7. In a wind mill attachment, the combination with power storing means, ratchet mechanism for winding up the power storing means, and a reciprocating device connected at one end with the ratchet mechanism and provided at the other end with means for connecting it with the pump rod of a wind mill, said device being composed of slidably connected members, and a cushioning spring adapted to yield to permit the pump rod to operate without winding up the power storing means after a predetermined amount of power has accumulated.

8. In a wind mill attachment, the combination of power storing means, ratchet mechanism for winding up the power storing means, and a reciprocating device connected at one end with the ratchet mechanism and provided at the other end with means for connecting it with the pump rod of a wind mill, said device being composed of slidably connected members, a cushioning spring adapted to yield to permit the pump rod to operate without winding up the power storing means after a predetermined amount of power has accumulated, and adjusting means for varying the tension of the spring.

In testimony whereof I affix my signature in presence of two witnesses:

LEWIS J. RING.

Witnesses:
H. D. KILGORE,
F. D. MERCHANT.